United States Patent Office 3,340,304
Patented Sept. 5, 1967

3,340,304
SELECTIVE OXIDATION OF CYCLOHEXANE
TO CYCLOHEXANONE
Johann G. D. Schulz and Arthur C. Whitaker, Pittsburgh,
Pa., assignors to Gulf Research & Development Company, Pittsburgh, Pa., a corporation of Delaware
No Drawing. Filed June 17, 1964, Ser. No. 375,920
22 Claims. (Cl. 260—586)

This invention relates to the selective preparation of cyclic ketones by the controlled efficient oxidation of the corresponding saturated cyclic hydrocarbon. In particular, this invention relates to the selective preparation of cyclohexanone by the oxidation of cyclohexane with an oxygen-containing gas.

The oxidation of cyclohexane with an oxygen-containing gas to produce cyclohexanol, cyclohexanone and adipic acid is well known in the art which is complex and confusing. The art is replete with contradictions on the advisability of using solvents, catalysts, low reaction temperatures (less than 100° C.), high reaction temperatures (more than 100° C.), etc. Various theories of reaction have been proposed, but problems still remain. One of the primary difficulties of the processes in the prior art is the poor efficiencies to the desired products obtained at conversions above about 5 to 10 percent of the cyclohexane. It has now been discovered that the efficiency of the oxidation of cyclohexane to cyclohexanol, cyclohexanone and adipic acid can be greatly improved as well as the selectivity to the preparation of cyclohexanone by a careful control of reaction conditions, including temperature, pressure, and charge stock composition.

In accordance with the invention, improved yields of a cyclic ketone are obtained by a process which comprises oxidizing a liquid reaction mixture comprising at least one saturated cyclic hydrocarbon having between 5 and 8 cyclic carbon atoms per molecule in the presence of at least an equilibrium concentration of a cyclic alcohol corresponding to said saturated cyclic hydrocarbon but less than 40 weight percent of said alcohol based on said saturated cyclic hydrocarbon with an oxygen-containing gas under oxidation conditions including a temperature between about 130° C. and 160° C. for a time sufficient to obtain a cyclic ketone to cyclic alcohol weight ratio of at least 1.5.

In one embodiment of this invention, the reaction pressure is such that any water formed in the reaction is removed continuously as a water-saturated cyclic hydrocarbon azeotrope at a rate such that the concentration of water in the reaction mixture is between 1 and 6 weight percent of the organic phase of the reaction mixture.

In yet another embodiment of this invention, wherein the reaction pressure exceeds the vaporization pressure of the water-saturated cyclic hydrocarbon azeotrope at the reaction temperature, the improvement which comprises periodically reducing the reaction pressure to below the vaporization pressure of the water-saturated cyclic hydrocarbon azeotrope and removing at least a portion of the water so as to maintain the water concentration in the reaction mixture between 1 and 6 weight percent.

The charge stock for this reaction can be any saturated cyclic hydrocarbon having between 5 and 8 cyclic carbon atoms per molecule and at least one cyclic carbon atom having two hydrogen atoms attached. Examples of suitable saturated cyclic hydrocarbons include cyclopentane; methyl cyclopentane; 1,3-dibutyl cyclopentane; cyclohexane; ethyl cyclohexane; 1,3,5-triisopropyl cyclohexane; 1-methyl, 4-octyl cyclohexane; 1,3,5-trichloro cyclohexane; cycloheptane; methyl cycloheptane; 1,1,4-trimethylcycloheptane; cyclooctane; and methylcyclooctane. The preferred charge stock is cyclohexane.

It is an improved feature of this invention in order to achieve high selectivity to the desired cyclic ketone to oxidize the saturated cyclic hydrocarbon in the presence of at least an equilibrium concentration of the cyclic alcohol corresponding to the saturated cyclic hydrocarbon. This equilibrium concentration will vary depending on reaction conditions and the specific saturated hydrocarbon charge stock, but, in general, the weight percent cyclic alcohol based on the total reaction mixture is between about 7 and about 12. Concentrations of the cyclic alcohol greater than about 12 weight percent can be present, such as by adding the alcohol to the saturated cyclic hydrocarbon, but while such increased concentrations are not harmful, the increased amounts are converted to the desired cyclic ketone and other oxidation products. Since the cyclic alcohols are normally more valuable than the saturated cyclic hydrocarbons, it is preferred to employ a minimum of the cyclic alcohol. It is important, however, that the alcohol concentration be less than 50 weight percent, and preferably less than 30 weight percent, since a reaction mixture comprising 50 weight percent cyclohexane and 50 weight percent cyclohexanol was found to be unreactive under the conditions of this invention. The cyclic alcohol concentration can, therefore, vary between about 7 and 40 weight percent of the reaction mixture and is preferably between 7 and 30, and more preferably between 7 and 12 weight percent of the total reaction mixture.

While it is not certain, it is believed the production of the cyclic ketone from the saturated cyclic hydrocarbon occurs by two routes, namely, from the decomposition of the cyclic peroxide (the initial product from the oxidation of cyclohexane) and by the conversion of the cyclic alcohol to the cyclic ketone. These reactions are shown in Equations 1 to 5 below:

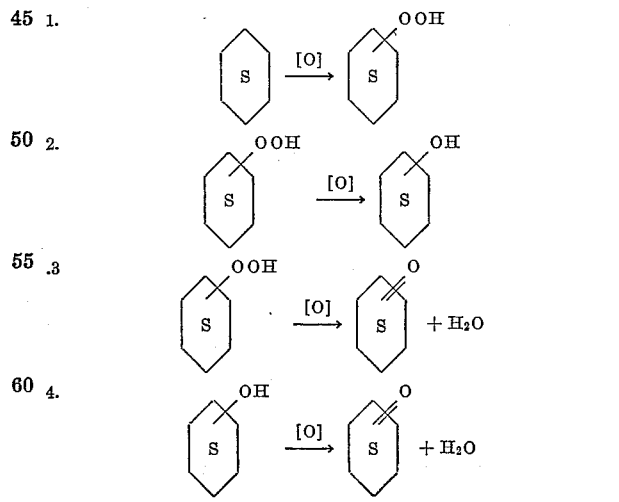

5.

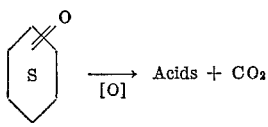

Initially, the cyclic hydroperoxide decomposes to both the alcohol and ketone (Equations 2 and 3), and a portion of the alcohol is converted to the ketone (equation 4). Initially, the total amount of alcohol formed is about equivalent to the total amount of ketone formed. As the alcohol concentration increases, reaction 4 becomes more important and the ketone to alcohol ratio in the reaction mixture begins to increase. When the alcohol concentration reaches a certain level, there is about as much alcohol being formed by reaction 2 as is being converted to ketone by reaction 4. This "certain level" is what is termed the "equilibrium concentration" of alcohol. It is believed this is a dynamic type of equilibrium concentration, that is, alcohol is still being continuously formed, but at about the same rate as it is being converted to other products, namely the ketone. By controlling the conversion of the cyclic ketone to acids, the selectivity of the reaction for the production of the ketone is increased.

The desired cyclic alcohol concentration can be achieved in any suitable manner. For example, the cyclic alcohol can be added directly to the saturated cyclic hydrocarbon in the desired concentration before the oxidation is begun, or the desired alcohol concentration can be achieved in situ by the oxidation of the saturated cyclic hydrocarbon until the desired concentration is reached and thereafter continuing the oxidation of the saturated cyclic hydrocarbon in the presence of the cyclic alcohol. It has been found that the cyclic alcohol concentration appears to reach a level between about 7 and 12 weight percent of the reaction mixture and remain constant while the weight percent cyclic ketone continues to increase with continuing oxidation. If the charge stock contains no cyclic alcohol initially, the reaction time would be correspondingly increased before the phenomenon of this invention would be fully realized. These findings are contrary to those in the prior art which indicate that alcohol and ketone are produced in about equal proportions, and, in order to achieve good efficiencies, the total conversion of the saturated cyclic hydrocarbon must be kept low. While it is not certain, it is believed the improved process of the present invention resides in an appreciation for the first time of the interdependence and criticality of maintaining the water and alcohol concentrations and the reaction temperature within the narrow limits defined herein.

The reaction time can vary over a wide range depending on the reaction conditions including temperature, pressure and charge stock composition. The reaction time should be sufficient to obtain a cyclic ketone to cyclic alcohol weight ratio of at least 1.5 to 1, and preferably at least 2 to 1. The weight ratio of cyclic ketone to cyclic alcohol can be as great as 5 to 1 or more under the conditions of this invention. If some cyclic alcohol is added initially to the reaction mixture, then, of course, less reaction time will be required to achieve a ketone to alcohol ratio of at least 1.5 to 1. As an example, when between 7 and 12 weight percent cyclohexanol is added to the cyclohexane charge, a suitable reaction time is between 2 and 5 hours. When cyclohexane alone is charged, containing if desired a small amount of ketone initiator and a hydrocarbon soluble metal salt catalyst, a suitable reaction time is between about 4 and about 10 hours. When cyclohexane alone is the charge stock, the reaction time should be sufficient to obtain at least a 20 weight percent conversion of the cyclohexane, and preferably a conversion between 25 and 50 weight percent of the cyclohexane.

It has also been found that during the initial portion of the reaction the water of reaction can be removed substantially as quickly as it is formed and still achieve high efficiency to the formation of the cyclic alcohol and ketone. Substantially complete water removal can continue until the presence of carbon dioxide is detected in the effluent gases by any suitable means such as gas chromatographic analysis or temperature increase of a suitable carbon dioxide absorbent. It has been found that the presence of carbon dioxide in the effluent gases indicates the presence of further oxidized products of reaction such as adipic, glutaric and succinic acids. Carbon dioxide does not appear initially in the effluent gases since, as noted by Equation 5 above, there is not a sufficient amount of ketone available to promote the formation of further oxidized products. While the conversion of cyclohexane is inhibited somewhat by the presence of water in the reaction zone, the formation of acids is more drastically inhibited under the conditions of this invention, and consequently the presence of water in the concentration range defined above is desirable once carbon dioxide is detected in the effluent gas stream. By the initial removal of water substantially as quickly as it is formed, the oxidation of cyclohexane to intermediate oxidation products such as cyclohexanone is promoted.

For simplicity the following discussion will relate to the oxidation of cyclohexane to yield primarily cyclohexanol, cyclohexanone and adipic acid. It is understood, however, that other saturated cyclic hydrocarbons having from 5 to 8 cyclic carbon atoms per molecule behave similarly in the presence of their corresponding cyclic alcohols to yield primarily the corresponding cyclic ketone.

The oxidation of cyclohexane occurs with any gas containing molecular oxygen such as oxygen, air or oxygen enriched air. The oxygen-containing gas enters in finely comminuted form through any suitable means, for example, through a sparger. The reaction pressure should be at least sufficient to maintain the reactants in the liquid phase. Thus, for example, the reaction pressure is generally between about 40 and 350 p.s.i.g. or higher. It is preferred that an oxygen-containing gas having at least 50 and more preferably greater than 95 percent oxygen be employed so that a low total pressure but high oxygen partial pressure is available in the reaction zone. In one preferred embodiment of this invention, the reaction pressure is just sufficient to cause continuous gentle refluxing in the reaction zone. In order to attain a reasonable oxygen concentration in the reaction mixture, an oxygen-containing gas of high oxygen content, i.e. over 80 volume percent oxygen should be employed. By gentle refluxing is meant the removal of a water-cyclohexane azeotrope at such a rate that the water content of the reaction mixture is less than 6 weight percent but not less than about 1 weight percent. The removal of all of the water of reaction substantially as quickly as it is formed, it has been discovered, results in reduced over-all efficiencies and reduced selectivity to the desired cyclic ketone. If the water of reaction is not removed, but is permitted to remain in the reaction zone, the upper limit on conversion is about 20 weight percent of the cyclohexane charge, and while the production of the desired cyclic ketone is selective so long as the equilibrium concentration of cyclic alcohol is present, it is preferred, as noted above, to remove the water to within the defined limits.

In another embodiment of this invention wherein the total reaction pressure is greater than the pressure at which the water of reaction (i.e., a water-cyclohexane azeotrope) can continuously be removed, the reaction pressure can be periodically reduced to allow a portion of the water of reaction to be removed as the azeotrope. The frequency and prolongation of pressure reduction are not critical so long as the water level is maintained within the limits defined above. It is preferred when this method of operation is employed to remove a portion of the water periodically so the water concentration remains low, say between 1 and 4 weight percent in order to promote the reaction. In general, the pressure reductions can occur every 5 to 30 minutes, preferably every 10 to 20 minutes. One means of determining a proper time for a pressure reduction-water removal period is to automatically reduce the pressure the desired degree when the oxidation reaction decreases, as indicated by a reduced oxygen uptake. The desired degree of pressure reduction depends of course on the reaction temperature, for the pressure should be reduced to a level where a cyclohexane-water azeotrope can be removed at the reaction temperature.

An important feature of this invention resides in the the reaction temperature employed. It is critical to obtain high selectivity to the production of the desired cyclic ketones to maintain the reaction temperature within the rather narrow limits of between about 130° C. and about 160° C. If a reaction temperature of below about 130° C. is employed, progressively more alcohol is obtained. At temperatures above about 160° C., the over-all reaction efficiency decreases as well as the selectivity to the desired ketone.

The oxygen-containing gas is added to the reaction mixture at a rate sufficient to maintain the desired pressure. As the reaction proceeds, oxygen is absorbed and the pressure decreases. It is also desirable to maintain an oxygen bleed on the unit so as to remove inert gases.

The process of this invention can occur in the presence or absence of a catalyst. A suitable catalyst is a hydrocarbon soluble cobalt compound, such as a cobalt salt of an organic acid having between about 2 and 20 carbon atoms per molecule, such as cobalt acetate, cobalt octanoate and cobalt naphthenate. Other suitable catalysts include the hydrocarbon soluble compounds of copper, cerium, vanadium, chromium, manganese, etc., such as copper acetate; cerium acetate; vanadium proprionate; chromium naphtenate; manganese acetate; manganese octanoate, etc. The cobalt compounds are preferred. The amount of catalyst may indeed be minute, e.g. as little as 1 p.p.m. of metal, for example, in the form of a hydrocarbon soluble salt. Amounts between 1 and 1000 p.p.m. of metal as the hydrocarbon soluble salt and preferably 50 and 500 p.p.m. can suitably be employed.

The invention will be further described with reference to the following specific examples.

In all of the examples to follow, the charge stock was either 520 grams of cyclohexane or a mixture of 520 grams of cyclohexane and about 50 grams of cyclohexanol. A small amount of cyclohexanone (1.6 grams) was added as an initiator. Unless otherwise indicated, the reaction temperature was 135° C. and the reaction pressure 70 p.s.i.g. A small amount (0.5 gram) of a cobalt naphthenate catalyst was used. The reaction procedure comprised first adding the charge stock to a 0.75 liter reaction vessel equipped with a temperature measuring device, an oxygen inlet sparger, a vapor outlet, and means for adding and removing liquids. The charge stock was then heated to the desired temperature and oxygen was added to achieve the desired reaction pressure. Oxygen was then continuously added through the sparger in the form of small bubbles to maintain the desired pressure. In the runs made at 70 p.s.i.g., the pressure was too high at the reaction temperature to continuously remove the water of reaction. In these runs, the reaction pressure was permitted to fall to below 40 p.s.i.g. to remove a portion of the water of reaction as an azeotrope with cyclohexane. These periodic pressure reductions occurred between about every 10 and 20 minutes of the run.

Several runs were made at 45 p.s.i.g., and at this pressure water is continuously removed as a cyclohexane-water azeotrope, and the cyclohexane is separated physically from the water and recycled back into the reaction mixture.

A series of runs were made oxidizing cyclohexane at reaction times varying between 4 and 6.5 hours. The results are given in Table I below.

TABLE I

| | Example No. | | |
|---|---|---|---|
| | 1 | 2 | 3 |
| Run Conditions: | | | |
| Temperature, °C | 135 | 135 | 135 |
| Pressure, p.s.i.g. of $O_2$ | 70 | 70 | 70 |
| Reaction Time, hours | 4.0 | 6.5 | 6.0 |
| Charge Stock: | | | |
| Cyclohexane (grams) | 520 | 520 | 520 |
| Cyclohexanone (grams) | 1.6 | 1.6 | 1.6 |
| Catalyst: Cobalt Naphthenate (grams) | 0.05 | 0.05 | 0.05 |
| Conversion of Cyclohexane: Wt. percent | 30.6 | 35.1 | 36.2 |
| Product in Grams: | | | |
| Cyclohexanol | 50.1 | 53.6 | 56.7 |
| Cyclohexanone | 100.3 | 115.3 | 129.3 |
| Adipic Acid | 28.1 | 56.8 | 42.8 |
| Glutaric | 3.5 | 3.1 | 1.3 |
| Succinic | 1.4 | 3.4 | 3.8 |
| $H_2O$ | 31.4 | 38.3 | 43.4 |
| $CO_2$ | 1.6 | 4.2 | 6.4 |
| Efficiencies to— | | | |
| Cyclohexanol | 26.5 | 24.6 | 25.3 |
| Cyclohexanone | 54.1 | 54.1 | 58.7 |
| Adipic Acid | 7.9 | 17.9 | 13.1 |
| Glutaric | 1.4 | 1.1 | 0.4 |
| Succinic | 0.6 | 1.3 | 1.4 |
| Total | 90.5 | 98.9 | 98.9 |
| Concentration of— | | | |
| (1) Cyclohexanol in Final Reaction Mixture | 9.2 | 9.4 | 10.0 |
| (2) Cyclohexanone in Final Reaction Mixture | 18.4 | 20.2 | 22.9 |
| Cyclohexanone to Cyclohexanol, Weight Ratio | 2.00 | 2.15 | 2.28 |

Referring to Table I, the final cyclic alcohol concentration based on the total reaction mixture was between 9 and 10 weight percent for Examples 1, 2 and 3 despite different reaction times. The final ketone concentration varies between 18 weight percent for the 4 hour run (Example 1) and 22.9 weight percent for the 6 hour run (Example 3).

A second series of runs were made wherein the charge stock was 520 grams of cyclohexane, between 50 and 53 grams of added cyclohexanol, 0.05 gram of cobalt naphthenate and 1.6 grams of cyclohexanone. The run times varied from 4 to 6 hours. The results are given on Table II below.

TABLE II

| | Example No. | | | |
|---|---|---|---|---|
| | 4 | 5 | 6 | 7 |
| Run Conditions: | | | | |
| Temperature, °C | 135 | 135 | 135 | 125 |
| Pressure, p.s.i.g. of $O_2$ | 70 | 70 | 70 | 70 |
| Reaction time, hours | 4.0 | 6.0 | 6.0 | 4.5 |
| Charge Stock: | | | | |
| Cyclohexane (grams) | 520 | 520 | 520 | 520 |
| Cyclohexanone (grams) | 1.6 | 1.6 | 1.6 | 1.6 |
| Catalyst: Cobalt Naphthenate (grams) | 0.05 | 0.05 | 0.05 | 0.05 |
| Conversion of Cyclohexane: Wt. percent | 20.1 | 33.0 | 22.2 | 16.5 |
| Product in Grams: | | | | |
| Cyclohexanol | [1] 50 | [2] 53 | [3] 53.2 | [4] 89.5 |
| Cyclohexanone | 104.6 | 129.0 | 102.2 | 34.6 |
| Adipic Acid | 17.5 | 44.6 | 26.6 | 1.0 |
| Glutaric | 0.7 | 4.8 | 0.0 | 0.0 |
| Succinic | 1.8 | 2.5 | 0.0 | 0.0 |
| $H_2O$ | 21.7 | 34.9 | 33.3 | 18.5 |
| $CO_2$ | 1.9 | 4.0 | 0.0 | 0.0 |
| Efficiencies to— | | | | |
| Cyclohexanol | | | 2.3 | 37.7 |
| Cyclohexanone | 85.7 | 64.5 | 75.8 | 34.4 |
| Adipic Acid | 10.1 | 15.0 | 13.3 | 0.7 |
| Glutaric | 0.4 | 1.8 | 0.0 | 0.0 |
| Succinic | 1.2 | 1.1 | 0.0 | 0.0 |
| Total | 97.4 | 82.3 | 91.40 | 72.70 |
| Concentration of— | | | | |
| (1) Cyclohexanol in— | | | | |
| (a) Start of Run | 8.8 | 9.3 | 8.8 | 8.9 |
| (b) Finish of Run | 8.45 | 9.1 | 9.1 | 16 |
| (2) Cyclohexanone in Final Reaction Mixture | 17.7 | 22.1 | 17.4 | 6.2 |
| Cyclic Ketone to Alcohol, Weight Ratio | 2.1 | 2.43 | 1.91 | 0.39 |

[1] 50 grams added initially.
[2] 53 grams added initially.
[3] 50 grams added initially.
[4] 51 grams added initially.

Referring to Table II, a comparison of Examples 4, 5 and 6 shows that adding 50–53 grams of cyclohexanol to the 520 grams of cyclohexane results in little or no production of additional cyclohexanol. The concentration of alcohol is about 9 weight percent of the total reaction mixture, which is just about the concentration of alcohol formed in Examples 1, 2 and 3 in Table I above where no alcohol was added initially.

Comparing Example 7 on Table II with Examples 1 through 6 on Tables I and II shows the criticality of reaction temperature for the production of the desired ketone. At 125° C. (Run 7—Table II), the alcohol concentration increased to 16 weight percent of the reaction mixture and the ketone content fell drastically from about 18 to 6 weight percent of the reaction mixture. The overall efficiency was also reduced (to 72.70 percent) while the production of acids was very small.

*Example 8*

The run for this example was similar to the runs in Examples 1 to 3 above except the reaction temperature was 160° C. This run is summarized in Table III below.

TABLE III

|  | Example No. | |
|---|---|---|
|  | 8 | 9 |
| Run Conditions: | | |
| Temperature, ° C | 160 | 135 |
| Pressure, p.s.i.g. of O₂ | 70 | 70 |
| Reaction Time, hours | 6.0 | 3.0 |
| Charge Stock: | | |
| Cyclohexane (grams) | 520 | 520 |
| Cyclohexanone (grams) | 1.6 | 1.6 |
| Catalyst: Cobalt Naphthenate (grams) | 0.05 | 0.05 |
| Conversion of Cyclohexane: Percent by wt | 38.6 | 17.23 |
| Product in Grams: | | |
| Cyclohexanol | 43.2 | 35.4 |
| Cyclohexanone | 99.3 | 44.2 |
| Adipic Acid | 48.2 | 8.1 |
| Glutaric | 3.2 | |
| Succinic | 3.9 | |
| H₂O | 59.7 | 11.0 |
| CO₂ | 8.6 | 0.6 |
| Efficiencies to: | | |
| Cyclohexanol | 18.1 | 33.2 |
| Cyclohexanone | 43.4 | 42.3 |
| Adipic Acid | 13.8 | 5.2 |
| Glutaric | 1.0 | |
| Succinic | 1.4 | |
| Total | 74.3 | 80.7 |
| Concentration of— | | |
| (1) Cyclohexanol in— | | |
| (a) Start of Run | 0 | 0 |
| (b) Finish of Run | 8.4 | 6.9 |
| (2) Cyclohexanone in Final Reaction Mixture | 19.2 | 8.5 |
| Cyclohexanone to Cyclohexanol, Weight Ratio | 2.28 | 1.25 |

Referring to Table III, Example 8 shows that at 160° C. the total reaction efficiency to alcohol, ketone and acids is reduced considerably to 74.3 percent.

Thus, a reaction temperature of 160° C. represents about the upper desirable reaction temperature for the production of cyclic ketones by the process of this reaction.

*Example 9*

This run was the same as the runs for Examples 1 to 3 on Table I above except the reaction time was only three hours resulting in a conversion of cyclohexane of only 17.23 weight percent. This run is summarized on Table III above.

Referring to Table III, the ketone to alcohol weight ratio for Example 9 was a little more than 1:1, that is, 1.25:1 and the cyclohexanol concentration in the organic phase product was 6.9 weight percent. The adipic, glutaric and succinic acid concentrations were kept low by the presence of water in the reaction zone which was periodically (every 10 to 20 minutes) removed by lowering the pressure to flash-off a water-cyclohexane azeotrope and returning the cyclohexane so removed.

Comparing Example 9 on Table III with Examples 1 to 3 on Table I and Examples 4 to 6 on Table II shows that if cyclohexanol is not added initially and the conversion is below about 20 weight percent of the cyclohexane, then the cyclohexanol and cyclohexanone are produced in about equal proportions by weight. The phenomenon of this invention does not occur until an equilibrium concentration of cyclohexanol is present in the reaction mixture. It appears from Example 9 that this equilibrium concentration is almost reached since the ketone to alcohol ratio is beginning to increase. The final concentration of cyclohexane in Example 9 is 6.9 weight percent.

TABLE IV

|  | Example No. | | |
|---|---|---|---|
|  | 10 | 11 | 12 |
| Run Conditions: | | | |
| Temperature, ° C | 135 | 135 | 135 |
| Pressure, p.s.i.g. of O₂ | 45 | 45 | 45 |
| Reaction Time, hours | 5.5 | 5.5 | 5.5 |
| Charge Stock: | | | |
| Cyclohexane (grams) | 520 | 520 | 520 |
| Cyclohexanone (grams) | 1.6 | 1.6 | 1.6 |
| Catalyst: Cobalt Naphthenate (grams) | 0.05 | 0.05 | 0.05 |
| Conversion of Cyclohexane: Wt. percent | 22.0 | 23.3 | 24.9 |
| Product in Grams: | | | |
| Cyclohexanol | 39.0 | 41.5 | 53.7 |
| Cyclohexanone | 73.9 | 82.7 | 83.3 |
| Adipic Acid | 14.8 | 17.5 | 17.4 |
| Glutaric | 0.6 | 0.8 | 1.3 |
| Succinic | | 1.5 | 1.1 |
| H₂O | 22.0 | 24.5 | 24.9 |
| CO₂ | 2.2 | 3.7 | 4.1 |
| Efficiencies to: | | | |
| Cyclohexanol | 28.6 | 28.8 | 34.9 |
| Cyclohexanone | 55.3 | 58.5 | 55.2 |
| Adipic Acid | 7.5 | 8.4 | 7.7 |
| Glutaric | 0.3 | 0.4 | 1.0 |
| Succinic | | 0.9 | 0.8 |
| Total | 91.4 | 95.6 | 97.8 |
| Concentration of— | | | |
| (1) Cyclohexanol in— | | | |
| (a) Start of Run | 0 | 0 | 0 |
| (b) Finish of Run | 7.3 | 7.65 | 9.8 |
| (2) Cyclohexanone in Final Reaction | 13.8 | 15.2 | 15.2 |
| Cyclohexanone to Cyclohexanol, Weight Ratio | 1.89 | 1.99 | 1.55 |

Referring to Table IV, the conversions in Examples 10 to 12 were not high (22 to 24.9 weight percent) despite the 5.5 hour reaction time since the partial pressure of oxygen was much lower. The cyclohexanol concentration in Examples 10 through 12 was between 7 and 10 weight percent.

Another series of runs were made wherein varying amounts of water were added to cyclohexane to determine the effect of water on the conversion of cyclohexane.

*Example 13*

In this example, the charge stock consisted of 520 grams of cyclohexane, 0.05 gram of cobalt naphthenate and 49 grams of water (about 10 weight percent water based on the reaction mixture). The reaction pressure was 70 p.s.i.g. and the reaction temperature was 135° C. No reaction occurred.

*Example 14*

Example 16 was repeated except only 19.8 grams of water (about 4 percent by weight) were added initially. The reaction proceeded for about one hour before stopping. The water initially added and that formed during the reaction was maintained in the reaction zone. A 10 percent conversion of cyclohexane was achieved and the products comprised 21.2 grams of cyclohexanone and 10.54 grams of cyclohexanol. The total amount of water in the reaction zone was 30.95 grams or about 6 weight percent.

Examples 13 and 14 show that the presence of 10 weight percent water initially in the reaction mixture appears to inhibit the oxidation of cyclohexane to cyclohexanol and cyclohexanone while the presence of 4 weight percent water initially allowed the reaction to proceed until 6 weight percent was present. Thus, about 6 weight percent water would appear to be the upper desirable limit since the oxidation of cyclohexane to cyclohexanol and cyclohexanone is inhibited when greater concentrations of water are employed.

Another series of runs was made to determine the amount of water to inhibit the formation of acids from cyclohexanone.

*Example 15*

A charge stock consisting of 563.1 grams of cyclohexanone and 83.2 grams of water (14 percent by weight water) was oxidized by passing oxygen at 70 p.s.i.g. through the reaction mixture containing 0.05 gram of cobalt naphthenate at 135° C. for four hours. A conversion of only 2 weight percent of the ketone to acids was obtained.

*Example 16*

Example 15 was repeated except 515.1 grams of cyclohexanone and 108.2 grams of water (20 weight percent) were employed. After four hours no oxidation had occurred.

*Example 17*

Example 15 was repeated except 544.0 grams of cyclohexanone and 53.2 grams of water (6.6 weight percent) were added initially. There was a 10.3 weight percent conversion of the ketone to acids in four hours.

A comparison of Examples 15 through 17 shows that 14 weight percent water is more than enough to inhibit the formation of acids from cyclohexanone. However, it had previously been found that 10 weight percent water in cyclohexane inhibits the oxidation of cyclohexane to cyclohexanone. The optimum amount of water to both inhibit the formation of acids while permitting an adequate oxidation of cyclohexane to the ketone would appear to be 6 weight percent or less.

*Example 18*

In this run, a charge stock, 260 grams of cyclohexane, 260 grams of cyclohexanol, 1.6 grams of cyclohexanone and 0.05 gram of cobalt naphthenate was contacted with oxygen at 70 p.s.i.g. and 135° C. No reaction occurred.

Example 18 shows that 50 weight percent alcohol in the charge is too much to obtain oxidation of the cyclohexane under the conditions of this invention.

Resort may be had to such variations and modifications as fall within the spirit of the invention and the scope of the appended claims.

We claim:
1. A process for the selective preparation of a cyclic ketone which comprises oxidizing a liquid reaction mixture comprising at least one saturated cyclic hydrocarbon having between 5 and 8 cyclic carbon atoms per molecule with a gas containing molecular oxygen in the presence of at least an equilibrium concentration of a cyclic alcohol corresponding to said saturated cyclic hydrocarbon but less than 40 weight percent of said alcohol based on said saturated cyclic hydrocarbon under oxidation conditions including a temperature between about 130° C. and 160° C. for a time sufficient to obtain a cyclic ketone to cyclic alcohol weight ratio of at least 1.5 and to obtain a conversion of at least 20 weight percent of said saturated cyclic hydrocarbon while maintaining a water concentration in said reaction mixture between 1 and 6 weight percent of the organic phase of said reaction mixture.

2. A process according to claim 1 wherein the saturated cyclic hydrocarbon is cyclohexane.

3. A process according to claim 2 wherein the reaction temperature is between about 130° C. and 140° C. for a time sufficient to obtain a cyclohexanone to cyclohexanol weight ratio of at least 2.

4. A process according to claim 2 wherein said reaction mixture comprises between 7 and 40 weight percent of cyclohexanol.

5. A process according to claim 4 wherein the alcohol concentration is between 7 and 12 weight percent and the cyclohexanone to cyclohexanol weight ratio is at least 2.

6. A process according to claim 4 wherein the hydrocarbon soluble oxidation catalyst is a hydrocarbon soluble compound of cobalt.

7. A process according to claim 6 wherein any water formed in the reaction is removed continuously as a water-cyclohexane azeotrope at a rate such that the concentration of water in the reaction mixture is between 1 and 6 weight percent of the reaction mixture.

8. In a process according to claim 6 wherein the reaction pressure exceeds the vaporization pressure of the water-cyclohexane azeotrope at the reaction temperature, the improvement which comprises periodically reducing the reaction pressure to below the vaporization pressure of the water-cyclohexane azeotrope and removing at least a portion of the water so as to maintain the water concentration in the reaction mixture between 1 and 6 weight percent.

9. A process according to claim 1 wherein any water formed initially in the reaction is removed substantially as quickly as it is formed as a water-saturated cyclic hydrocarbon azeotrope until the presence of carbon dioxide is noted in the effluent gases and thereafter maintaining a concentration of water in the reaction mixture between 1 and 6 weight percent of the organic phase of the reaction mixture.

10. A process according to claim 9 wherein the saturated cyclic hydrocarbon is cyclohexane.

11. A process according to claim 10 wherein the oxidation occurs in the presence of a hydrocarbon soluble oxidation catalyst.

12. A process according to claim 11 wherein the hydrocarbon soluble oxidation catalyst is a hydrocarbon soluble compound of cobalt and the cyclohexanol concentration at the start of the oxidation is between 7 and 12 weight percent of the reaction mixture.

13. A process according to claim 1 wherein the reaction pressure is such that any water formed in the reaction is removed continuously as a water-saturated cyclic hydrocarbon azeotrope at a rate such that the concentration of water in the reaction mixture is between 1 and 6 weight percent of the organic phase of the reaction mixture.

14. A process according to claim 13 wherein the saturated cyclic hydrocarbon is cyclohexane.

15. In a process according to claim 1 wherein the reaction pressure exceeds the vaporization pressure of the water-saturated cyclic hydrocarbon azeotrope at the reaction temperature, the improvement which comprises periodically reducing the reaction pressure to below the vaporization pressure of the water-saturated cyclic hydrocarbon azeotrope and removing at least a portion of the water of reaction so as to maintain the water concentration in the reaction mixture between 1 and 6 weight percent of the organic phase of the reaction mixture.

16. A process according to claim 15 wherein the saturated cyclic hydrocarbon is cyclohexane.

17. A process according to claim 16 wherein the cyclohexane from the water-cyclohexane azeotrope is separated and continuously recycled to the reaction zone.

18. A process for the selective preparation of a cyclic ketone which comprises:
oxidizing a reaction mixture comprising at least one saturated cyclic hydrocarbon having between 5 and 8 cyclic carbon atoms per molecule with a gas containing molecular oxygen to produce a reaction mixture comprising a cyclic alcohol corresponding to said saturated cyclic hydrocarbon under oxidation conditions until said cyclic alcohol concentration reaches an equilibrium concentration level; and
thereafter continuing the oxidation of said reaction mixture in the presence of the equilibrium concentration of said cyclic alcohol at a temperature between 130° C. and 160° C. for a time sufficient to obtain a cyclic ketone to cyclic alcohol weight ratio of at least 1.5 and a total conversion of said saturated cyclic hydrocarbon of at least 20 weight percent while maintaining a water concentration in said reaction mixture between 1 and 6 weight percent of the organic phase of said reaction mixture.

19. A process according to claim 18 wherein the saturated cyclic hydrocarbon is cyclohexane.

20. A process for the selective preparation of a cyclic ketone which comprises:

oxidizing a reaction mixture comprising at least one saturated cyclic hydrocarbon having between 5 and 8 cyclic carbon atoms per molecule and between 7 and 12 weight percent of said saturated cyclic hydrocarbon of a cyclic alcohol corresponding to said saturated cyclic hydrocarbon with a gas containing molecular oxygen under oxidation conditions including a temperature between 130° C. and 160° C. and a pressure such that a water-saturated cyclic hydrocarbon azeotrope cannot be continuously removed; periodically reducing the reaction pressure to allow a portion of the water of reaction to be removed as an azeotrope with said saturated cyclic hydrocarbon; repressuring with said oxygen containing gas to attain the desired operating pressure; and continuing said oxidation for a total conversion of said saturated cyclic hydrocarbon of at least 20 weight percent while maintaining the concentration of water in the reaction mixture at all times between 1 and 6 weight percent of the organic phase of the reaction mixture.

21. A process according to claim 20 wherein the periodic reduction of reaction pressure occurs when there is a reduction in oxygen uptake by the reaction mixture.

22. A process according to claim 21 wherein the pressure reductions occur every 5 to 30 minutes.

References Cited

UNITED STATES PATENTS 2,825,742   3/1958   Scheuler et al. _____ 260—586

FOREIGN PATENTS 627,058   5/1963   Belgium.

LEON ZITVER, *Primary Examiner.*

M. M. JACOB, *Assistant Examiner.*

UNITED STATES PATENT OFFICE
CERTIFICATE OF CORRECTION

Patent No. 3,340,304　　　　　　　　　　September 5, 1967

Johann G. D. Schulz et al.

It is hereby certified that error appears in the above numbered patent requiring correction and that the said Letters Patent should read as corrected below.

Column 3, line 29, after "oxidation" insert -- reaction --; column 7, TABLE III, second column, line 16 thereof, for "43.4" read -- 42.4 --; column 8, TABLE IV, first column, line 30, for "(2) Cyclohexanone in Final Reaction" read -- (2) Cyclohexanone in Final Reaction Mixture --.

Signed and sealed this 27th day of August 1968.

(SEAL)
Attest:

Edward M. Fletcher, Jr.
Attesting Officer

EDWARD J. BRENNER
Commissioner of Patents